United States Patent
Saur et al.

(10) Patent No.: US 7,360,606 B2
(45) Date of Patent: Apr. 22, 2008

(54) HAND MACHINE TOOL WITH A REMOVEABLE TOOL HOLDER

(75) Inventors: Dietmar Saur, Gomaringen (DE); Axel Kuhnle, Freiberg a. N. (DE); Helmut Wanek, Kirchheim/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 10/343,365

(22) PCT Filed: Sep. 6, 2001

(86) PCT No.: PCT/DE01/03415

§ 371 (c)(1),
(2), (4) Date: Jan. 30, 2003

(87) PCT Pub. No.: WO02/24403

PCT Pub. Date: Mar. 28, 2002

(65) Prior Publication Data

US 2003/0188877 A1 Oct. 9, 2003

(30) Foreign Application Priority Data

Sep. 22, 2000 (DE) ................................ 100 47 021

(51) Int. Cl.
*B23Q 3/00* (2006.01)
(52) U.S. Cl. .......................... 173/29; 173/132; 173/48; 279/19; 279/22; 279/19.4; 279/19.5; 408/238; 408/239 R
(58) Field of Classification Search ................. 173/132, 173/130, 133, 216, 217, 48, 29; 279/75, 279/19, 19.2, 19.3, 19.4, 19.5, 74, 62, 19.6, 279/22; 408/238, 239 R
See application file for complete search history.

(56) References Cited

U.S. PATENT DOCUMENTS 4,174,113 A * 11/1979 Eckman ...................... 173/132

(Continued)

FOREIGN PATENT DOCUMENTS

| DE | 42 05 259 A1 | 8/1993 | |
|----|----|----|----|
| DE | 94 17 252 | 3/1995 | |
| DE | 44 45 597 A | 6/1996 | |
| DE | 196 21 610 A1 | 12/1997 | |
| DE | 19724532 A1 * | 12/1998 | ................ 279/19.6 |

(Continued)

*Primary Examiner*—Rinaldi I. Rada
*Assistant Examiner*—Michelle Lopez
(74) *Attorney, Agent, or Firm*—Michael J. Striker

(57) ABSTRACT

A hand power tool has a striking element via which a tool (10) in a tool holder (12) can be driven in striking fashion, which the tool holder can be detachably secured—via its body (14)—to a drive part (16) via at least one locking element (18), which the locking element, in its engaged position, is capable of being fixed in position radially by a retaining element (20), which the retaining element is capable of being automatically guided by means of an operating element (22) out of its locked position into a release position that radially releases the locking element (18) in order to release the tool holder (12), whereby the retaining element (20) is capable of being moved by a corresponding component (14) into its release position against a spring force of a spring element (24) when the tool holder (12) is pushed onto the drive part (18), wherein the retaining element (20) is captively held on the drive part (16) and is capable of being guided into its release position by the operating element (22) in the push-on direction (26) of the tool holder (12) against a spring force of a spring element (24).

15 Claims, 3 Drawing Sheets

U.S. PATENT DOCUMENTS

| | | | |
|---|---|---|---|
| 4,900,202 A * | 2/1990 | Wienhold | 279/75 |
| 5,016,892 A * | 5/1991 | Lafforgue et al. | 279/19 |
| 5,199,833 A * | 4/1993 | Fehrle et al. | 279/19.3 |
| 5,398,946 A * | 3/1995 | Quiring | 279/75 |
| 5,437,465 A * | 8/1995 | Vogele et al. | 279/22 |
| 5,603,516 A * | 2/1997 | Neumaier | 279/75 |
| 5,820,312 A * | 10/1998 | Stock et al. | 173/205 |
| 5,971,403 A * | 10/1999 | Yahagi et al. | 279/75 |
| 6,092,814 A * | 7/2000 | Kageler | 279/19.4 |
| 6,131,671 A * | 10/2000 | Shibata et al. | 173/48 |
| 6,241,026 B1 * | 6/2001 | Wache et al. | 173/132 |
| 6,536,780 B2 * | 3/2003 | Baumann et al. | 279/19.4 |
| 6,691,799 B2 * | 2/2004 | Kuhnle et al. | 173/132 |
| 6,854,740 B2 * | 2/2005 | Baumann et al. | 279/19.6 |

FOREIGN PATENT DOCUMENTS

| | | |
|---|---|---|
| DE | 198 57 774 A | 6/2000 |
| DE | 199 14 577 A | 10/2000 |
| GB | 2 313 566 A | 12/1997 |

* cited by examiner

HAND MACHINE TOOL WITH A REMOVEABLE TOOL HOLDER

BACKGROUND OF THE INVENTION

The invention is based on a hand power tool with a removable tool holder.

A hand power tool with a removable tool holder was made known in DE 196 21 610 A1. The hand power tool comprises a spindle sleeve into which a body of the tool holder can be inserted and that can be locked in position by means of locking elements. The locking elements are captively held in the spindle housing and, in a locked position, they are covered radially by a retaining element. To remove the tool holder, the retaining element is capable of being moved axially via an operating sleeve into a position that radially releases the locking elements.

SUMMARY OF THE INVENTION

The invention is based on a hand power tool, in particular a drilling and/or chipping hammer, comprising a striking element via which a tool in a tool holder can be driven in striking fashion, which said tool holder can be detachably secured—via its body—to a drive part via at least one locking element, which said locking element, in its engaged position, is capable of being fixed in position radially by a retaining element, which said retaining element is capable of being guided by means of an operating element out of its locked position into a release position that radially releases the locking element in order to release the tool holder, whereby the retaining element is capable of being moved by a corresponding component into its release position against a spring force of a spring element when the tool holder is pushed onto the drive part.

It is proposed that the retaining element is captively held on the drive part and is capable of being guided into its release position by the operating element in the push-on direction of the tool holder against a spring force of a spring element. The direction of operation of the operating element to release the retaining element of the tool holder is advantageously directed against a no-load operation impulse acting in the direction of operation; as a result of this, the tool holder can be reliably prevented from becoming detached on its own, and—in the case of powerful drilling and chipper hammers in particular—a secure fastening of the removable tool holder can be obtained.

By being arranged on the drive part, the retaining element can be advantageously moved automatically into its release position by a component on the tool holder when the tool holder is fastened in place. With automatic release, a release motion of the retaining element to secure the tool mount to the drive part, and, with manual release, a release motion of the retaining element to remove the tool holder from the drive part can be advantageously carried out in the same direction and against the same compression spring.

If the body of the tool holder—when fastened in place—surrounds at least a portion of the drive part, a particularly robust and structurally simple embodiment can be obtained. A gap seal can be formed between a punch dolly of the striking element and the drive part that protects a drive unit of the hand power tool against contamination. Wear can be minimized, and any damage caused when the tool is inserted can be prevented. Moreover, the locking element can be advantageously secured to the body of the tool holder; this allows the locking element to be replaced easily, as necessary, or it can be replaced with the tool holder.

In a further embodiment of the invention, it is proposed that a component that is actively connected at least with the drive part, and, particularly advantageously, a toothing integrally molded on the drive part move the locking element radially outwardly when the tool holder is pushed on, and the locking element moves the retaining element out of its locked position into its release position. Additional components, space, weight, and assembly expense can be spared. It is also feasible, however, that, when the tool holder is pushed on, the retaining element is guided out of its locked position and into its release position by a component that is separate from the locking element.

BRIEF DESCRIPTION OF THE DRAWINGS

Further advantages result from the following description of the drawings. An exemplary embodiment of the invention is shown in the drawings. The drawings, the description, and the claims contain numerous features in combination. One skilled in the art will advantageously consider them individually as well and combine them into reasonable further combinations.

DETAILED DESCRIPTION OF THE PREFERRED EMBODIMENTS

Figure 1:
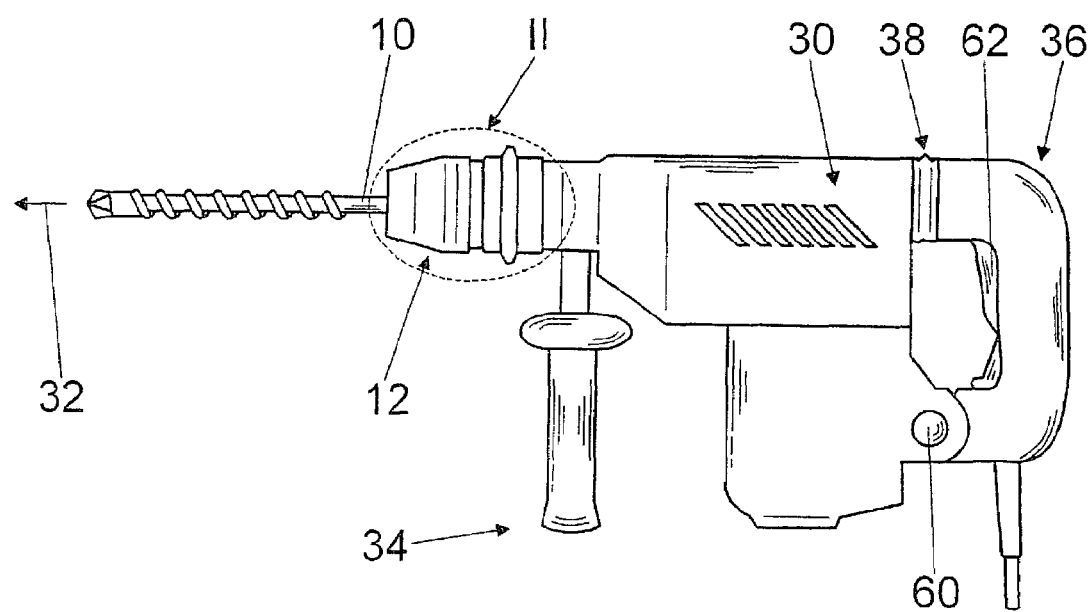
FIG. 1 is a schematic view of a drilling hammer.

FIG. 1 shows a drilling hammer comprising an electric motor (not shown) in a housing 30, and comprising a gearbox and a striking element via which a tool 10 or a drill bit mounted in a tool holder 12 is capable of being driven in rotating and striking fashion. A first handle 34 extending perpendicularly to the direction of operation 32 is secured to the housing 30 away from a direction of operation 32 after the tool holder 12. Located on a side of the housing 30 furthest away from the tool 10 is a second, U-shaped handle 36 extending perpendicularly to the direction of operation 32 that is interconnected—at a first end furthest away from a tool axis—with the housing 30 via a hinge 60 having a pivot axis extending transversely to the direction of operation 32. At a second end, the handle 36 is interconnected with the housing 30 via an insulating device 38. An operating switch 62 formed by a rocker is located on the handle 36.

Figure 2:
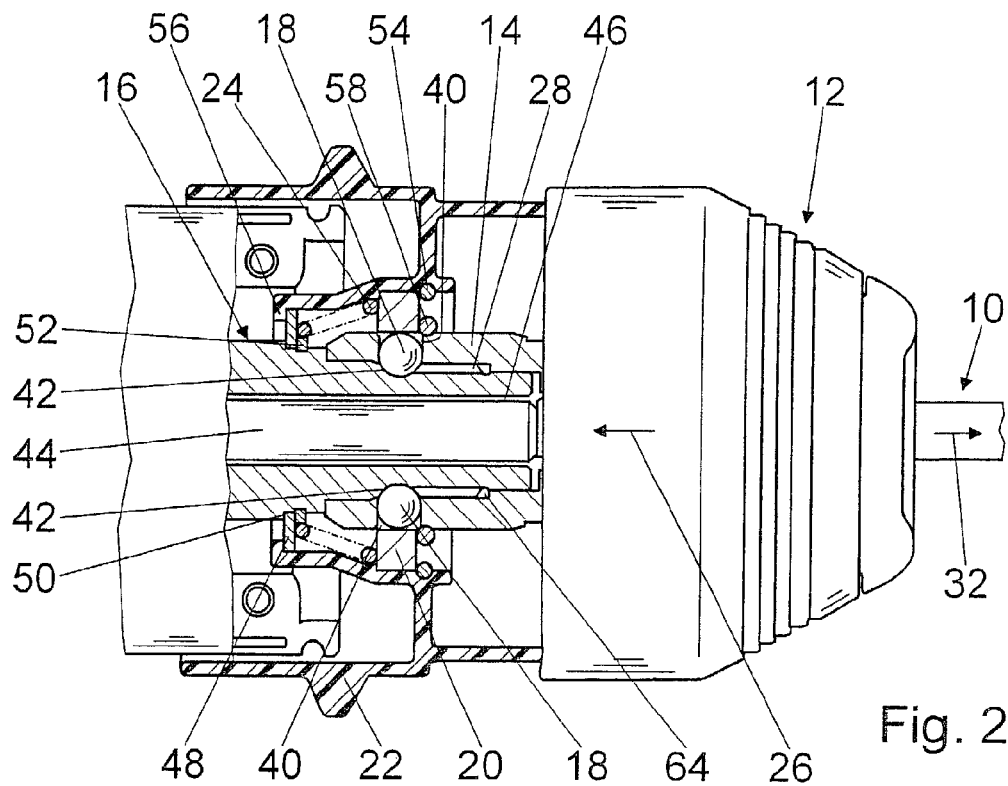
FIG. 2 is a sectional detail view of Section II of the drilling hammer in FIG. 1 with a removable tool holder.

The tool holder 12 is detachably secured—with its body 14—to a drive part 16 formed by a spindle tube via three locking elements 18 distributed evenly around the circumference (FIG. 2). In the direction toward the drive part 16, the body 14 has a larger diameter than the drive part 16, and it surrounds said drive part. A punch dolly 44 of the not-shown striking element is located radially inside the drive part 16, and a gap seal 46 is formed between the punch dolly 44 and the drive part 16.

Each of the locking elements 18 designed as balls are located in recesses 40 in the body 14 of the tool holder 12 and engage radially inwardly in hemispherical recesses 42 formed in the drive part 16. It would be feasible, in principle, to replace the hemispherical recesses with a full-perimeter groove. The hemispherical recesses 42 are located in the push-on direction 26 of the tool holder 12 after an outer toothing 28 integrally molded on the drive part 16.

The motion of the locking elements 18 is blocked radially outwardly by an annular retaining element 20, and they are fixed in position in their engaged position, which said retaining element radially covers the locking element 18. The body 14 of the tool holder 12 is firmly interconnected in the axial direction and in the direction of rotation with the body 14 of the tool holder 12 via the locking element 18. Moreover, the body 14 is firmly interconnected in the direction of rotation with the drive part 16 via an inner toothing 64 integrally molded on the body 14, which said inner toothing engages in the outer toothing 28 integrally molded on the drive part 16.

Figure 3:
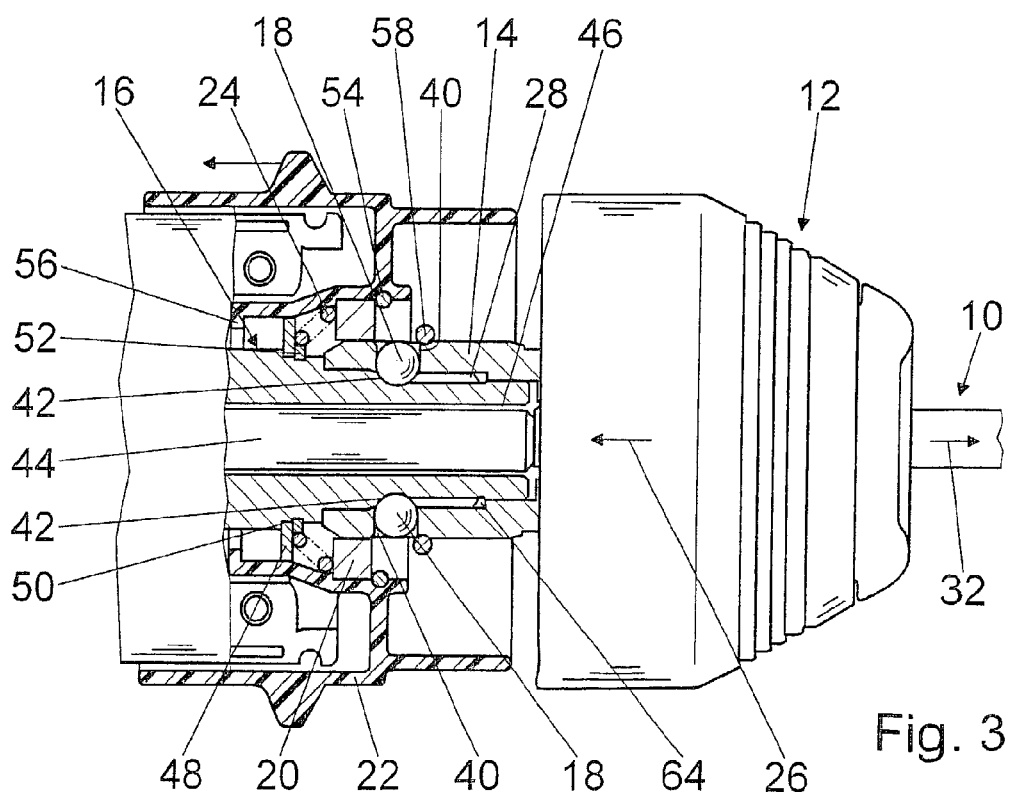
FIG. 3 shows the tool holder in FIG. 2 in the manually released state.

The retaining element 20 is captively held against the drive part 16 and, in fact, inside a movably supported operating sleeve 22, and, to release the tool holder 12, it is capable of being guided out of its locked position and into its release position by the operating sleeve 22 in the push-on direction 26 of the tool holder 12 against a spring force of a helical compression spring 24 (FIG. 3). The helical compression spring 24 bears with one end against a projection 50 of the drive part 16 via a disk 48 in the push-on direction 26. The disk 48 is secured in the direction of operation 32 via a retainer 52 on the drive part 16. With a second end, the helical compression spring 24 acts in the direction of operation 32 on the retaining element 20, which—on the side closest to the tool 10 on its outer circumference—acts via a circlip 54 on the operating sleeve 22 that—when the tool holder 12 has been attached (FIG. 1)—bears against the drive part 16 in the direction of operation 32 with a radially inwardly pointing collar 56 via the disk 48 and the retainer 52.

Figure 4:
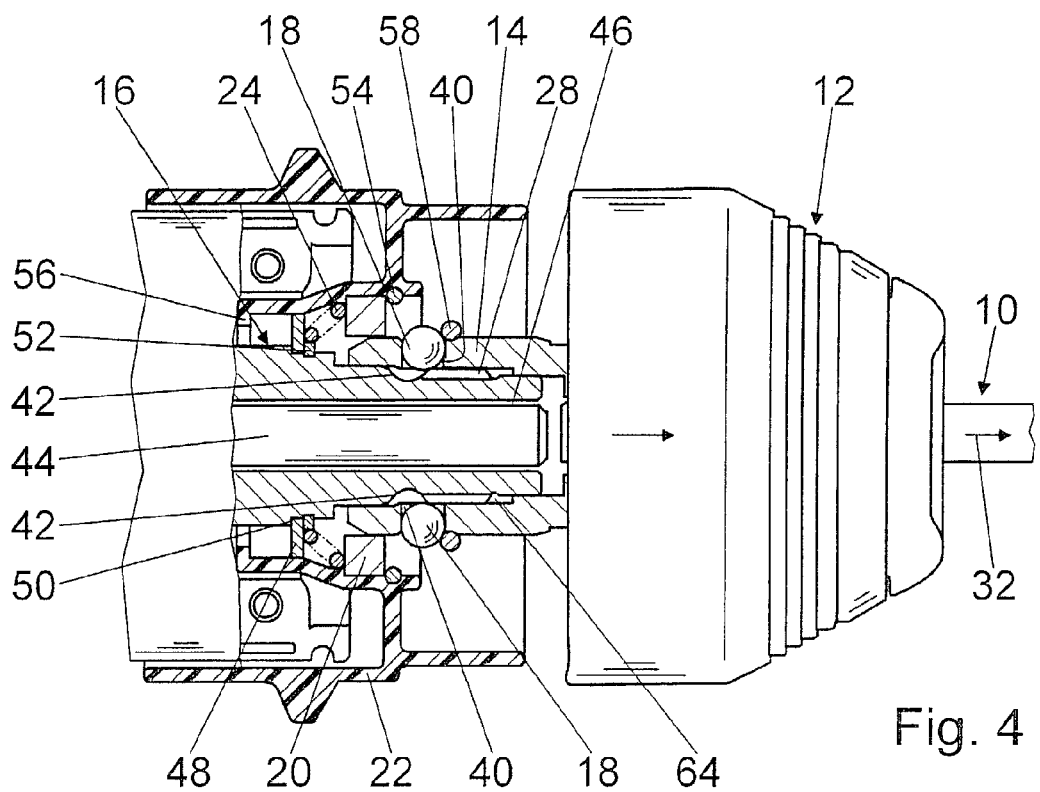
FIG. 4 shows the tool holder in FIG. 2 being removed from a drive part.

When the operating sleeve 22 is moved manually in the push-on direction 26 to release the tool holder 12, the retaining element 20 is carried with the operating sleeve 22 via the circlip 54 and it is moved into its release position against the helical compression spring 24 (FIG. 3). Finally, when the tool holder 12 is pulled off of the drive part 16, the locking elements 18 can be displaced radially outwardly out of the recesses 42 in the direction of operation 32 (FIG. 4). The locking elements 18 are captively held in the recesses 40 in the body 14 of the tool holder 12 and, in fact, radially inwardly by means of integral constrictions in the recesses 40 and, radially outwardly, by means of a circlip 58 attached to the body 14.

Figure 5:
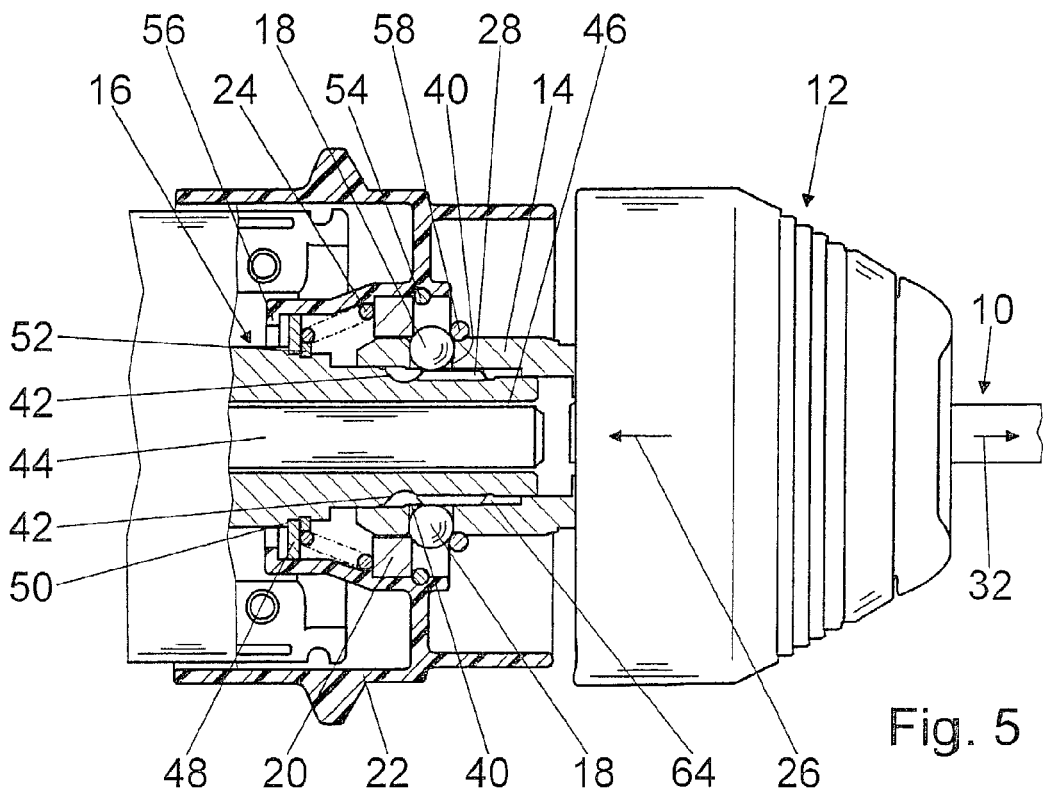
FIG. 5 shows the tool mount in FIG. 2 being pushed onto the drive part.

When the body 14 of the tool holder 12 is pushed onto the drive part 16 in the push-on direction 26, the tool holder 12 is turned until the inner toothing 64 integrally molded on the body 14 can mesh with the outer toothing 28 integrally molded on the drive part 16. During the push-on motion, the locking elements 18 are displaced radially outwardly by the outer toothing 28 of the drive part 16, and they come to bear against the retaining element 20. When the push-on motion continues, the retaining element 20 is moved by the locking element 18 into its release position and, in fact, automatically and/or without operating the operating sleeve 22 manually (FIG. 5). If the locking elements 18 come to rest in the drive part 16 via the hemispherical recesses 42, they are displaced radially inwardly into the hemispherical recesses 42 by the helical compression spring 24 via the retaining element 20. The helical compression spring 24 then moves the retaining element 20 radially into its locked position via the locking elements 18, and the tool holder 12 is fixed in position on the drive part 16.

| Reference Numerals | |
|---|---|
| 10 | Tool |
| 12 | Tool holder |
| 14 | Body |
| 16 | Drive part |
| 18 | Locking element |
| 20 | Retaining element |
| 22 | Operating element |
| 24 | Spring element |
| 26 | Push-on direction |
| 28 | Toothing |
| 30 | Housing |
| 32 | Direction of operation |
| 34 | Handle |
| 36 | Handle |
| 38 | Insulating device |
| 40 | Recess |
| 42 | Recess |
| 44 | Punch dolly |
| 46 | Gap seal |
| 48 | Disk |
| 50 | Projection |
| 52 | Retainer |
| 54 | Circlip |
| 56 | Collar |
| 58 | Circlip |
| 60 | Hinge |
| 62 | Operating switch |
| 64 | Inner teeth |

What is claimed is:

1. A hand power tool, comprising:

a drive part (16);

a tool holder (12) for mounting a tool (10), said tool holder (12) having a body (14), wherein said body (14) is capable of being pushed onto said drive part (16) in a push-on direction (26);

a striking element, wherein said tool (10) in said tool holder (12) is driveable in a striking fashion and in a rotating fashion about a rotation axis by said striking element;

at least one locking element (18), wherein said tool holder (12) is detachably secured with said body (14) to said drive part (16) via said locking element (18);

a retaining element (20) for fixing said locking element (18) radially to said rotation axis in an engaged position, wherein in said engaged position, said locking element (18) engages said drive part (16), wherein said retaining element (20) is captively-held on said drive part (16) when said tool holder (12) is released from said drive part (16);

an operating element (22) for guiding said retaining element (20) out of a locked position into a release position, said retaining element is disposed inside said operating element (22), wherein in the release position, said locking element (18) is released radially to said rotation axis in order to release said tool holder (12), wherein said locked position is a position of the retaining element (20) when the tool holder (12) is fixed on the drive part (16);

a spring element (24);

a component (18) of said tool holder (12) for moving said retaining element (20) automatically into said release position against a spring force of said spring element (24) when said tool holder (12) is pushed onto said drive part (16), wherein said retaining element (20) is guidable into said release position in said push-on direction (26) of said tool holder (12) by means of said operating element against a spring force of said spring element (24).

2. The hand power tool according to claim 1, wherein the body (14) of the tool holder (12), when fastened in place, surrounds at least a portion of the drive part (16).

3. The hand power tool according to claim 2, wherein the locking element (18) is captively held on the body (14) of the tool holder (12).

4. The hand power tool according to claim 3, wherein the drive part (16) moves the locking element (18) radially outwardly when the tool holder (12) is pushed on, and the locking element (18) moves the retaining element (20) out of its locked position into its release position.

5. The hand power tool according to claim 4, wherein, when the tool holder (12) is pushed on, a toothing (28) integrally molded on the drive part (16) moves the locking element (18) radially outwardly.

6. The hand power tool according to claim 1, wherein an outer toothing (28) which is integrally molded on the drive part (16) is engageable in an inner toothing (64) integrally molded on an inner periphery of the tool holder (12).

7. A power tool according to claim 1, wherein said component is said locking element (18).

8. A power tool according to claim 1, comprising a component (54) for carrying said retaining element (20) with said operating element (22) into said release position in said push-on direction (26) against a spring force of said spring element (24) when said operating element (22) is moved manually in said push-on direction (26) to release said tool holder (12).

9. A power tool according to claim 1, wherein said spring element (24) bears with one end against said drive part (16).

10. A power tool according to claim 9, wherein said spring element (24) bears against said drive part (16) in said push-on direction (26) of the tool holder (12).

11. A power tool according to claim 9, wherein said drive part (16) has a projection (50), wherein said spring element (24) bears against said projection (50).

12. A power tool according to claim 1, having a direction of operation (32), whereby said spring element (24) acts in said direction of operation (32) on said retaining element (20).

13. A power tool according to claim 1, having a direction of operation (32), whereby said retaining element (20) acts in said direction of operation (32) on said operating element (22).

14. A power tool according to claim 1, wherein said operating element (22) bears against said drive part (16).

15. A power tool according to claim 14, having a direction of operation (32), whereby said operating element (22) bears against said drive part (16) in said direction of operation (32).

* * * * *